(12) United States Patent
Kenmochi et al.

(10) Patent No.: US 8,912,462 B2
(45) Date of Patent: Dec. 16, 2014

(54) METHOD OF MANUFACTURING ELECTRIC RESISTANCE WELDING PIPES HAVING EXCELLENT CHARACTERIZATION OF WELDED SEAMS

(75) Inventors: Kazuhito Kenmochi, Tokyo (JP); Takatoshi Okabe, Tokyo (JP); Hiroyasu Yokoyama, Tokyo (JP); Yuji Sugimoto, Tokyo (JP); Yoshifumi Fujioka, Tokyo (JP); Kei Sakata, Tokyo (JP); Tomohiro Inoue, Tokyo (JP); Hiroyuki Shirosawa, Tokyo (JP); Motoaki Egi, Tokyo (JP); Yasuo Nishida, Tokyo (JP); Muneyoshi Murakami, Tokyo (JP)

(73) Assignee: JFE Steel Corporation (JP)

( * ) Notice: Subject to any disclaimer, the term of this patent is extended or adjusted under 35 U.S.C. 154(b) by 1621 days.

(21) Appl. No.: 11/992,916

(22) PCT Filed: Nov. 9, 2006

(86) PCT No.: PCT/JP2006/322793
§ 371 (c)(1),
(2), (4) Date: Apr. 29, 2008

(87) PCT Pub. No.: WO2007/055405
PCT Pub. Date: May 18, 2007

(65) Prior Publication Data
US 2008/0230586 A1    Sep. 25, 2008

(30) Foreign Application Priority Data

| Nov. 11, 2005 | (JP) | 2005-326802 |
| Dec. 16, 2005 | (JP) | 2005-362720 |
| Apr. 28, 2006 | (JP) | 2006-124551 |
| Apr. 28, 2006 | (JP) | 2006-124553 |
| May 30, 2006 | (JP) | 2006-149889 |
| Jun. 13, 2006 | (JP) | 2006-163202 |

(51) Int. Cl.
*B23K 31/12* (2006.01)
*B21C 37/08* (2006.01)
*B21C 37/083* (2006.01)

(52) U.S. Cl.
CPC ......... *B21C 37/0822* (2013.01); *B21C 37/0826* (2013.01); *B21C 37/083* (2013.01); *B23K 31/12* (2013.01); *B23K 2201/06* (2013.01)
USPC ...................................... 219/61.11; 219/59.1

(58) Field of Classification Search
USPC ........... 219/59.1, 60 R, 60.2, 61, 61.11, 61.2, 219/61.5; 228/144, 146, 147; 413/58; 138/156; 29/700
See application file for complete search history.

(56) References Cited

U.S. PATENT DOCUMENTS 4,568,015 A * 2/1986 Toyooka et al. ............... 228/147
4,771,931 A * 9/1988 Matsui et al. .................. 228/147

(Continued)

FOREIGN PATENT DOCUMENTS

| FR | 1 446 169 A | 7/1966 |
| JP | 57-31485 A | 2/1982 |

(Continued)

OTHER PUBLICATIONS

Machine Translation of JP 08-192228.*

*Primary Examiner* — Brian Jennison
(74) *Attorney, Agent, or Firm* — DLA Piper LLP (US)

(57) ABSTRACT

A method of efficiently manufacturing electric resistance welding pipes having excellent characterization of welded seams is provided, by which each lateral edge of a rounded strip immediately before electric resistance welding is securely shaped with desired tapering flexibly in response to change in strip thickness, so that welding quality may be kept to be excellent. A method of manufacturing electric resistance welding pipes, in which a strip is subjected to forming, then edges thereof are formed to substantially face each other, and then the edges are subjected to electric resistance welding to form a pipe, wherein an edge and an edge opposed thereto at one of an upper-surface side and a lower-surface side of the strip are shaped with tapering before the forming by means of cutting or shaving, or finpass forming.

19 Claims, 5 Drawing Sheets

(56) References Cited

U.S. PATENT DOCUMENTS

| | | | |
|---|---|---|---|
| 5,942,132 A * | 8/1999 | Toyooka et al. | 219/61.2 |
| 2006/0191874 A1 * | 8/2006 | Holdren | 219/61 |

FOREIGN PATENT DOCUMENTS

| | | | |
|---|---|---|---|
| JP | 62-25007 U | 2/1987 |
| JP | 63-317212 A | 12/1988 |
| JP | 2-307686 A | 12/1990 |
| JP | 4-105709 A | 4/1992 |
| JP | 8-192228 A | 7/1996 |
| JP | 2001-170779 A | 6/2001 |
| JP | 2001-259733 A | 9/2001 |
| JP | 2003-164909 A | 6/2003 |

* cited by examiner

METHOD OF MANUFACTURING ELECTRIC RESISTANCE WELDING PIPES HAVING EXCELLENT CHARACTERIZATION OF WELDED SEAMS

RELATED APPLICATIONS

This is a §371 of International Application No. PCT/JP2006/322793, with an international filing date of Nov. 9, 2006 (WO 2007/055405 A1, published May 18, 2007), which is based on Japanese Patent Application Nos. 2005-326802, filed Nov. 11, 2005, 2005-362720, filed Dec. 16, 2005, 2006-124551, filed Apr. 28, 2006, 2006-124553, filed Apr. 28, 2006, 2006-149889, filed May 30, 2006, and 2006-163202, filed Jun. 13, 2006.

TECHNICAL FIELD

This disclosure relates to methods of manufacturing pipes required to have toughness of weld such as line pipes for oil wells, or pipes required to have strength of weld such as casings for oil wells.

BACKGROUND

Generally, pipes are roughly classified into welding pipes and seamless pipes. An electric resistance welding pipe as one of the welding pipes is manufactured by rounding a sheet by roll forming or the like, and then confronting each edge and welding. In the welding pipes, toughness and strength of weld are generally bad compared with those of a mother strip. In use of the pipes, it is an inevitable problem to ensure certain toughness and strength of weld for each application.

For example, since a line pipe for transporting crude oil or natural gas is often laid in a cold latitude, low temperature toughness is essentially concerned. Moreover, strength is importantly concerned with a casing for protecting a mining pipe in an oil well for mining crude oil.

Typically, a hot-rolled sheet (strip) to be a mother strip of an electric resistance welding pipe is subjected to composition design or heat treatment in consideration of properties of the mother strip after being formed into a pipe so that properties of the mother strip such as toughness and strength are secured.

However, since characterization of welded seams is severely affected by a method of the electric resistance welding rather than by the composition design or heat treatment of the mother strip, welding technique needs to be essentially improved.

In many cases, the following phenomenon may by a cause of problems for electric resistance welding, that is, oxides called penetrators are generated on a strip edge, and the penetrators are not discharged from the edge along with discharge of melting steel during electric resistance welding and remained thereon, and the remained penetrators cause reduction in toughness, leading to insufficient strength.

Thus, to remove the penetrators which are causes of conventional electric resistance welding failure from weld, earnest investigation has been made so far on an active discharging technique of melting steel from a strip edge in the weld. For example, JP-A-57-031485, JP-A-63-317212, JP-A-2001-170779 and JP-A-2003-164909 describe examples of investigation on a shape of each strip edge.

Moreover, JP-A-2001-259733 describes that lateral edges of a strip are chamfered in various shapes in order to facilitate adjustment of confronting pressure on edges at both sides of a strip in welding of an electric resistance welding pipe, and to improve welding reliability.

In JP-A-57-031485, JP-A-63-317212, JP-A-2001-170779 and JP-A-2003-164909, it is intended that each strip edge is shaped with tapering so as to discharge the penetrators along with discharge of melting steel. The reason for shaping the tapering is considered to be due to a fact that the strip edge can be easily shaped with the tapering. However, when the strip edge is shaped with straight or planar tapering having a uniform slope, defects such as oxides may have not been adequately discharged along with discharge of melting steel.

Moreover, JP-A-2001-259733 discloses various chamfer shapes for facilitating adjustment of confronting pressure. However, no description is found therein on a point of discharge of penetrators along with discharge of melting steel, and a point of improvement in characterization of welded seams (particularly low temperature toughness) through such discharge of penetrators. Therefore, a particular shape that is effective for improving the characterization of welded seams (particularly low temperature toughness) is completely unknown among the various chamfer shapes disclosed therein.

In an actual manufacturing process of electric resistance welding pipes, strips having various kinds of thickness are subjected to roll forming to be into pipes. When means for shaping the tapering on each strip edge is solely used, for example, a cutting bite or a shaving roll needs to be adjusted in position to be installed at an accurate interval similar to strip thickness, which has been a cause of significant reduction in production efficiency.

Thus, it could be advantageous to provide a method of efficiently manufacturing electric resistance welding pipes having excellent characterization of welded seams, which may adequately accelerate discharge of defects such as oxides along with discharge of melting steel, in addition, may not cause reduction in production efficiency.

SUMMARY

We provide:
1. A method of manufacturing electric resistance welding pipes, which improves characterization of welded seams, characterized in that during a process that a strip is subjected to forming, then edges thereof are confronted, and then the edges are subjected to electric resistance welding to form a pipe, edges at one of an upper-surface side and a lower-surface side of the strip, or both of upper and lower surfaces of the strip are shaped with tapering before electric resistance welding.
2. A method of manufacturing electric resistance welding pipes, which improves characterization of welded seams, characterized in that edges at one of an upper-surface side and a lower-surface side of a strip are shaped with tapering by cutting or shaving.
3. A method of manufacturing electric resistance welding pipes, which improves characterization of welded seams, characterized in that edges at one of an upper-surface side and a lower-surface side of a strip are shaped with tapering by a hole-shape roll.
4. A method of manufacturing electric resistance welding pipes, which improves characterization of welded seams, characterized in that edges at one of an upper-surface side and a lower-surface side of a strip are shaped with tapering by finpass forming.
5. A method of manufacturing electric resistance welding pipes, which improves characterization of welded seams, characterized in that edges at one of an upper-surface side and a lower-surface side of a strip are shaped with tapering by cutting or shaving, or by a hole-shape roll, and edges at the other surface side of the strip are shaped with tapering by finpass forming.

6. The method of manufacturing electric resistance welding pipes, which improves characterization of welded seams, according to the previous sections 1 to 5, characterized in that edges at one side in a thickness direction of the strip are round-shaped.

7. The method of manufacturing electric resistance welding pipes, which improves characterization of welded seams, according to the previous sections 2 to 3 or the previous sections 5 to 6, characterized in that the cutting or shaving, or the rolling using the hole-shape roll is performed before roll forming.

8. The method of manufacturing electric resistance welding pipes, which improves characterization of welded seams, according to the previous section 2 or the previous sections 5 to 6, characterized in that a tool having cutting blades disposed in a roll shape, or a roll-shape grinding stone is used, in which each cutting blade or a stone grinding surface includes a portion being approximately parallel to a strip edge, and a portion being inclined to the strip edge from a middle point.

9. The method of manufacturing electric resistance welding pipes, which improves characterization of welded seams, according to the previous section 2 or the previous sections 5 to 6, characterized in that a strip edge is subjected to cutting or grinding while a tool having cutting blades disposed in a roll shape, or a roll-shape grinding stone is contacted parallel to the strip edge, and a strip edge is subjected to cutting or grinding while a tool having different cutting blades disposed in a roll shape, or a roll-shape grinding stone is obliquely contacted to the strip edge, so that the strip edges are shaped with tapering.

10. The method of manufacturing electric resistance welding pipes, which improves characterization of welded seams, according to the previous section 1 or 2 or the previous sections 4 to 9, characterized in that the tapering immediately after cutting or grinding the strip, or the tapering immediately after rolling the strip using the hole-shape roll is made such that an angle from a perpendicular is in a range of 25° to 50°, and length of a perpendicular from a starting position to an end position of the tapering is 50% to 90% of strip thickness.

11. The method of manufacturing electric resistance welding pipes, which improves characterization of welded seams, according to the previous sections 1 to 10, characterized in that tapering of the strip immediately before electric resistance welding is made such that an angle from a perpendicular is in a range of 25° to 50°, and length of a perpendicular from a starting position to an end position of the tapering is 20% to 45% of strip thickness.

Figure 1:
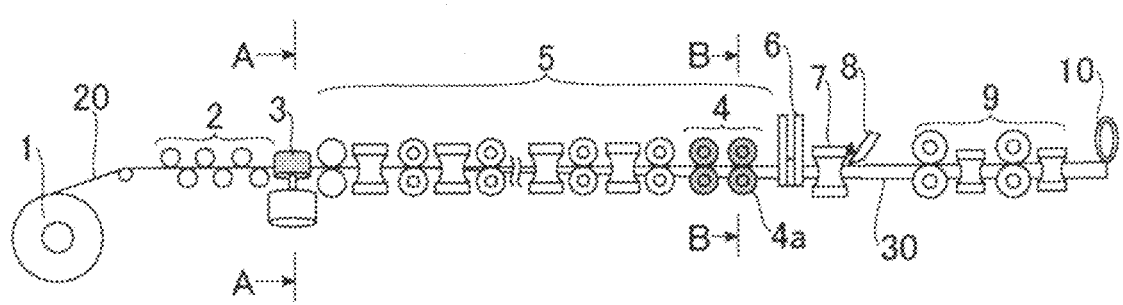
FIG. 1 is an explanatory diagram of manufacturing equipment of electric resistance welding pipes.

Numbers in the Figures refer to the following representative structure respectively:

1 uncoiler
2 leveler
3 means for shaping the tapering
31 cutting roll or shaving roll
31a cutting roll
31b shaving roll
31c cutting roll
31d shaving roll
32 hole-shape roll
4 finpass forming stand
4a finpass forming end stand
5 roll forming machine
6 induction heater
7 squeeze roll (electric resistance welding section)
8 bead cutting bite
9 sizer
10 pipe cutter
20 strip
30 pipe

DETAILED DESCRIPTION

Forming a strip refers to operation of gradually rounding a strip in a lateral direction so as to make a section profile of the strip to be a circular shape, and a process of the forming includes an initial stage of roll forming in which portions near edges at both lateral sides of the strip are bent, and a finpass rolling stage in which the strip is finely finished into a circular section profile.

Means for shaping the tapering on edges at one of an upper-surface side and a lower-surface of a strip is in a type different from a type of means for shaping the tapering on edges at the other of the upper-surface side and the lower-surface side, which is opposite to the previous one side, that is, the edges are shaped with the tapering by a plurality of means. Thus, the edges at one surface side are shaped with the tapering, then the edges at the other surface side are shaped with the tapering. According to this, even if strip thickness is varied, a vertical position of an apparatus for shaping the tapering is simply adjusted, and thereby the edges at both of the upper-surface side and the lower-surface side of the strip can be shaped with the tapering without reduction of production efficiency.

Thus, since the strip is approximately flat in a roll forming entrance side, the tapering is preferably shaped by cutting or shaving. Such shaping means of the tapering requires a relatively large installation space because its apparatus size is relatively large, therefore the means is hardly installed during or after roll forming since a space between two lateral edges of the strip, which are being or have been rounded, is reduced.

Moreover, since the apparatus for cutting or shaving is hard to vertically constrain the edge of the strip only by the apparatus itself, high positioning accuracy is required for installation of the apparatus in conjunction with installation of an apparatus for accurately keeping a position through which the strip passes. Therefore, a station of each apparatus needs to be increased in stiffness, leading to requirement of a further large installation space. Thus, the cutting or shaving means is preferably installed before roll forming.

When the edges at both of the upper-surface side and the lower-surface side of the strip are cut or shaved, since a finpass roll is filled with the strip in finpass rolling during roll forming, the edges of the strip are strongly pressurized, so that the previously shaped tapering is sometimes crushed and thereby a desired shape may not be obtained. Therefore, it is preferable that the edges are previously shaped with a larger tapering than a desired tapering in consideration of crushing of the edges of the strip in the finpass rolling. However, when the edges at both of the upper-surface side and the lower-surface side of the strip are shaped with the tapering, large tapering is hardly obtained due to a limit of strip thickness, edges at only one of the upper-surface side and the lower-surface side of the strip are preferably cut or shaved.

Next, the edges at the other surface side, which are still not shaped with the tapering, are shaped with the tapering by using finpass rolling. Since the edges at only one of the upper-surface side and the lower-surface side of the strip are shaped with the tapering from the above reason, the edges at the other surface side are preferably shaped with the tapering during or after roll forming in order to shape the tapering on both of the upper-surface side and the lower-surface side. Thus, the inventors noticed a phenomenon that the edges of the strip were easily crushed in the finpass rolling, and conceived use of the phenomenon. That is, when a fin of a finpass rolling roll is shaped with tapering in two stages, and a tapering angle of the fin and a contact position thereof to a strip edge are optimized depending on the amount of squeeze (upset) in finpass rolling, the edges at the other surface side which have not still shaped with the tapering can be also shaped with the tapering. Since such tapering work is performed by the finpass rolling itself, even if two edges, a space between which was reduced by rounding a strip in a lateral direction by roll forming, are extremely close to each other, the tapering work can be adequately carried out.

In this way, even if strips are different in thickness, the rounded, two lateral edges of the strip immediately before welding are shaped with tapering as desired depending on strip thickness.

The tapering is preferably shaped on the lateral edges at the upper-surface side of the strip to prevent the relatively large apparatus from interfering with a table for conveying the strip at a roll forming entrance side.

The tapering is preferably shaped on the two lateral edges of the strip 20 such that a slope angle α from the lateral edge of the strip 20 to the upper or lower surface of the strip 20 is 25° to 50° immediately before electric resistance welding, and a distance β between the tapering start position on the lateral edge of the strip 20 and the upper or lower surface is 20% to 40% of strip thickness.

That is, when the slope angle α is less than 25°, melting steel is inadequately discharged from the central portion in thickness of the strip, and penetrators are defectively remained, resulting in reduction in toughness or strength after electric resistance welding, and when the slope angle α is more than 50°, the tapering is problematically remained as a flaw on a product pipe still after electric resistance welding. Moreover, when the distance β is less than 20% of thickness, melting steel is inadequately discharged from the central portion in strip thickness, so that the penetrators tend to be remained, and when the distance β is more than 40% of thickness, the tapering is problematically remained as a flaw on a product pipe still after electric resistance welding.

Hereinafter, selected aspects of our methods and apparatus are described.

A manufacturing line of electric resistance welding pipes is shown in FIG. 1. The manufacturing line of electric resistance welding pipes has a basic configuration where a strip 20 is uncoiled from an uncoiler 1; then the strip is reformed to be flat by a leveler 2; then the strip 20 is gradually rounded by a roll forming machine 5; then two lateral edges of the rounded strip 20 are subjected to electric resistance welding using an electric resistance welder including an induction heating section 6 and a squeeze roll (electric resistance welding section) 7 so as to be formed into a pipe 30; then a weld bead portion of the pipe 30 is cut by a bead cutter 8; then the pipe 30 after cutting is adjusted in outer diameter by a sizer 9; and then the pipe is cut out into a predetermined length by a pipe cutter 10. The roll forming machine 5 has a predetermined number (herein, two) of finpass forming stands 4 in a last stage.

Figure 2:
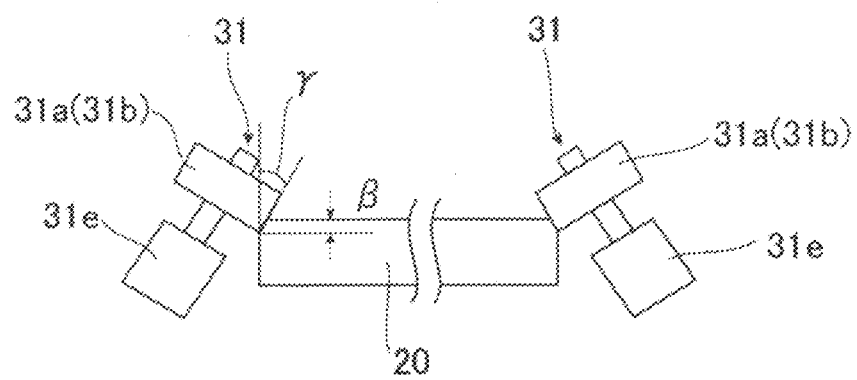
FIG. 2 is a diagram along an arrowed line A-A in FIG. 1.
Figure 3A:
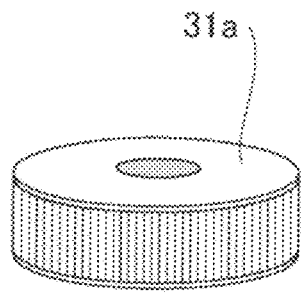
FIGS. 3A and 3B are partial detail diagrams of FIG. 2 respectively.
Figure 3B:
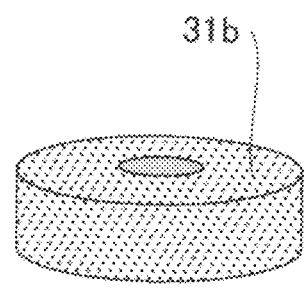

In addition to the basic configuration, the manufacturing line has cutting or shaving means 31 for shaping the tapering on two lateral edges at an upper-surface side of the strip 20 between the leveler 2 and the roll forming machine 5. As shown in FIG. 2 showing a diagram along an arrowed line A-A in FIG. 1, and in FIGS. 3A and 3B showing partial detail diagram of FIG. 2 respectively, the cutting or shaving means 31 rotates by a motor 3e a cutting tool 31a including cutting blades disposed in a roll shape (FIG. 3A), or a shaving stone 31b in a roll shape (FIG. 3B), and the cutting or shaving surface thereof is parallel to a roll axis. The cutting or shaving means 31 are disposed in pair in a lateral direction of the strip 20, and each roll axis is inclined by a predetermined angle γ from a vertical direction, thereby two lateral edges at the upper-surface side of the strip 20 are shaped with predetermined tapering (a slope angle from the lateral edge to the upper surface is γ, and a distance in a strip thickness direction from the upper surface to a tapering start position on the lateral edge is δ). Hereinafter, the cutting tool 31a including the cutting blades disposed in the roll shape is called cutting roll 31a, and the shaving stone 31b in the roll shape is called shaving roll 31b.

Figure 4A:
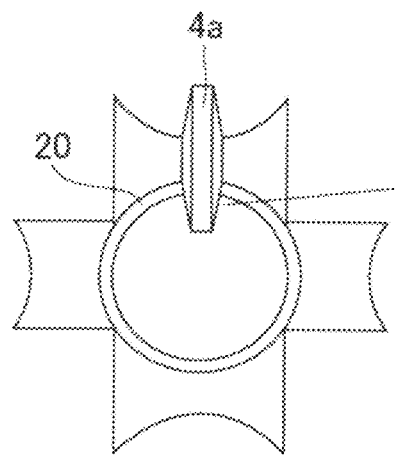
FIGS. 4A and 4B are diagrams along an arrowed line B-B in FIG. 1 respectively.
Figure 4B:
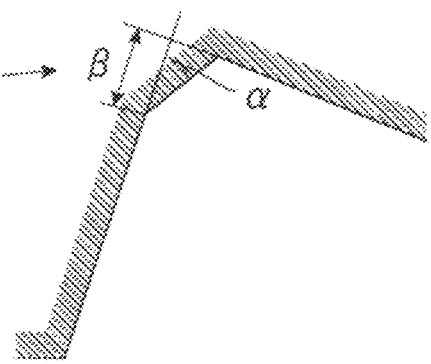

Furthermore, in the example shown in FIG. 4A showing a diagram along an arrowed line B-B in FIG. 1 and in FIG. 4B showing a partial detail diagram of FIG. 4A, an end stand 4a of the finpass forming stand 4 has a fin shape including two-stage tapering (a second-stage tapering angle is α, and second-stage slope vertical-length is β), and such a shape is printed to each lateral edge of the strip 20, thereby two lateral edges at a lower-surface side of the strip 20 (an outer-surface side of a pipe 30) are shaped with predetermined tapering (a slope angle from the lateral edge to the lower surface is α, and a distance in a strip thickness direction from a tapering start position on the lateral edge to the lower surface is β).

In the manufacturing line of electric resistance welding pipes configured in the above, in the case that strips 20 having different kinds of thickness are successively threaded, when the predetermined tapering is shaped on two lateral edges at the upper-surface side and the lower-surface side of each strip 20, the two lateral edges at the upper-surface side of the strip 20 are cut or shaved while the cutting roll 31a or the shaving roll 31b is inclined by the predetermined angle γ, and a position in a height direction of the roll 31a or 31b is finely adjusted, thereby the two lateral edges at the upper-surface side of the strip 20 are shaped with the predetermined tapering. In addition, the fin shape is printed to the two lateral edges at the lower-surface side of the strip 20 by the end stand 4a in finpass forming, thereby the two lateral edges at the lower-surface side of the strip 20 are shaped with the predetermined tapering. Thus, since the hole-shape rolling roll needs not be changed depending on strip thickness, or a relative position of the cutting bite or the like needs not be set with taking a long time unlike in the prior art, the two lateral edges of the strip 20 can be shaped with the predetermined tapering depending on strip thickness without reducing production efficiency.

As hereinbefore, the two lateral edges of the strip 20 before electric resistance welding can be shaped with the appropriate tapering in response to change in thickness of the strip 20. Therefore, welding quality can be kept to be excellent, and reduction in production efficiency can be suppressed, and consequently an electric resistance welding pipe having excellent characterization of welded seams can be efficiently manufactured.

Separately from the cutting or shaving means 31 for shaping the tapering on two lateral edges at the upper-surface side of the strip 20, cutting or shaving means for cutting or shaving two lateral edges may be provided approximately parallel to the lateral edges of the strip 20 at an upstream side of the means 31 as needed, so that the lateral edges of the strip 20 can be previously smoothened.

A manufacturing line of electric resistance welding pipes used in another example is approximately similar to the manufacturing line of electric resistance welding pipes used in the first example, but different in that the cutting or shaving means 31 for shaping the tapering on the two lateral edges at the upper-surface side of the strip 20 is arranged between the leveler 2 and the roll forming machine 5.

Figure 5:
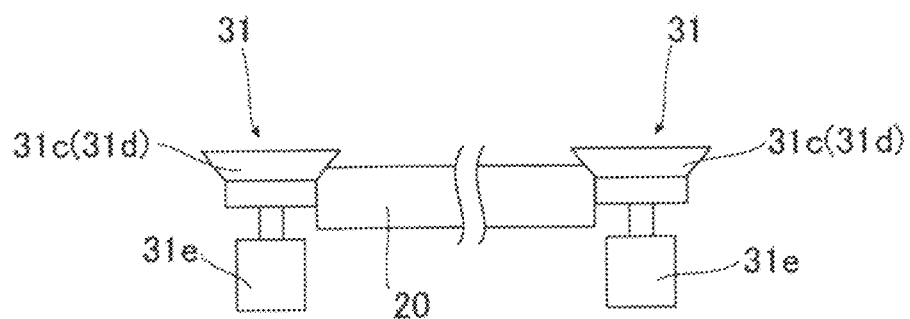
FIG. 5 is a diagram along an arrowed line A-A in FIG. 1.
Figure 6A:
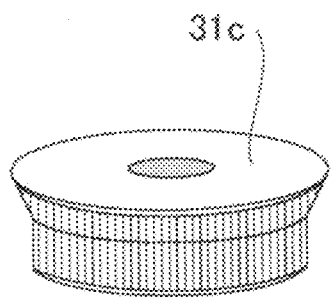
FIGS. 6A and 6B are partial detail diagrams of FIG. 5 respectively.
Figure 6B:
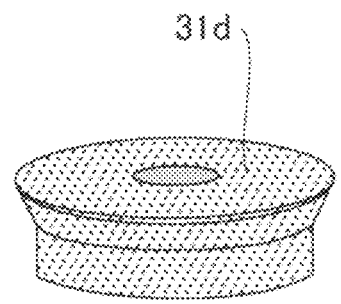

FIG. 5 shows a diagram of the cutting or shaving means 31 along an arrowed line A-A in FIG. 1. FIGS. 6A and 6B show partial detail diagrams of the cutting or shaving means 31 respectively. A cutting tool 31c (FIG. 6A) is a cutting tool in which cutting blades are disposed in a roll shape. A cutting surface of the cutting tool 31c has a shape where a portion approximately parallel to a roll axis is connected to a portion being outward inclined to the roll axis. A shaving stone 31d (FIG. 6B) has a roll shape. A shaving surface of the shaving stone 31d has a shape where a portion approximately parallel to a roll axis is connected to a portion being outward inclined to the roll axis. Hereinafter, the cutting tool 31c is called a cutting roll 31c with tapering, and the shaving stone 31d is called shaving roll 31d with tapering.

By using the cutting roll 31c or the shaving roll 31d having such a shape, for strips having different kinds of thickness, lateral edges at an upper-surface side of each strip can be easily shaped with tapering being fixed in angle and position by one cutting roll 31c or shaving roll 31d.

To shape the tapering on lateral edges at a lower-surface side of the strip 10, as in the first example, as shown in FIG. 4A showing the diagram along the arrowed line B-B in FIG. 1 and in FIG. 4B showing the partial detail diagram of FIG. 4A, the end stand 4a of the finpass forming stand 4 has the fin shape including two-stage tapering (the second-stage tapering angle is α, and the second-stage slope vertical-length is β), and such a shape is printed to the lateral edges of the strip 20, thereby the two lateral edges at the lower-surface side of the strip 20 (an outer surface side of the pipe 30) are shaped with predetermined tapering.

Consequently, the two lateral edges of the strip 20 can be shaped with appropriate tapering in response to change in thickness of the strip 20 before electric resistance welding. Therefore, welding quality can be kept to be excellent, and reduction in production efficiency can be suppressed, and consequently an electric resistance welding pipe having excellent characterization of welded seams can be efficiently manufactured.

In the first and second examples, tapering is shaped such that edges at the upper-surface side of the strip and edges at the lower-surface side thereof are in symmetry with respect to a center plane in strip thickness. However, this is not restrictive, and tapering may be shaped such that edges at the upper-surface side of the strip and edges at the lower-surface side thereof are in asymmetry with respect to the central plane in strip thickness.

In the case of a manufacturing line in which a forming direction of a strip is vertically opposite to that in the manufacturing line shown in FIG. 1 (i.e., in which the upper surface of the strip is an outer surface), the lateral edges at the lower-surface side of the strip can be shaped with the tapering by cutting or shaving before forming, and the lateral edges at the upper-surface side of the strip can be shaped with the tapering by finpass forming.

As described before, the following phenomenon has been often as a cause of problems for electric resistance welding, that is, oxides called penetrators are generated on a strip edge, and the penetrators are not discharged from the edge along with discharge of melting steel during electric resistance welding and remained thereon, and the remained penetrators cause reduction in toughness, leading to insufficient strength.

Thus, in the prior art, it was intended that the strip edge was shaped with the tapering so as to discharge the penetrators along with discharge of melting steel. The reason for such shaping of the tapering is considered to be a fact that the strip edge is easily shaped. However, when the strip edge was shaped with straight or planar tapering, defects such as oxides were not adequately discharged along with discharge of melting steel in some cases.

To clarify a cause of this phenomenon, we found the following. That is, melting steel generated at start of welding is small in amount on the strip edge being shaped with the tapering because of small contact area, then area is increased in a portion welded by upset (pressure-welding) in electric resistance welding, and the amount of melting steel is accordingly increased. However, it was found that in the prior tapering being shaped uniformly in a strip thickness direction, since a discharge angle (discharge amount) of melting steel was constant in the strip thickness direction, even if melting steel was adequately discharged from a portion near an end in strip thickness, it was sometimes inadequately discharged from a portion near the center in strip thickness, causing a phenomenon that melting steel that had been previously melted filled a strip surface and was solidified thereon to be into a lid, which sometimes blocked discharge of melting steel to be subsequently discharged from a welding surface.

Thus, we investigated methods of excellently discharging melting steel continuously with passing of welding time. As a result, we discovered that melting steel was small in amount during welding the portion near the center in strip thickness, and the melting steel was increased in amount during welding the portion near the end in strip thickness, therefore a particular edge shape was necessary for continuously discharging approximately constant amount of melting steel.

We investigated various shapes based on the result, as a result, found that a strip edge was subjected to round shaping, thereby continuous discharge of melting steel was able to be excellently performed. That is, when the strip edge is subjected to round shaping, since the contact area is abruptly increased during welding the portion near the center in strip thickness, the discharge amount of melting steel is increased during that, and since the contact area is gradually increased during welding the portion near the end in strip thickness, the discharge amount of melting steel is decreased during that. Such operation enables stable discharge of melting steel, and eliminates the phenomenon that melting steel that has been previously discharged from a welding surface is solidified to be into a lid, blocking discharge of melting steel to be subsequently discharged.

Thus, molting steel is adequately discharged from the strip edge so that penetrators can be sufficiently removed, as a result, characterization such as toughness or strength of welded seams can be held to be excellent.

When the round shaping of the strip edge is performed to edges at both sides in a strip thickness direction (corners at both of the upper-surface side and the lower-surface side), a large effect is given.

When the round shaping is performed by a hole-shape roll, since the strip edge is subjected to insufficient plastic working, a desired shape is hardly obtained. However, the desired shape can be directly obtained by performing the round shaping by cutting or stone grinding. Moreover, in finpass forming, the strip is rounded so as to make its section profile to be a circular shape, therefore the strip edge is strongly pressurized by a fin. Thus, the fin is previously shaped with a desired round shape, thereby a shape of the strip edge can be adequately close to the desired round shape.

Thus, since the strip is approximately flat at a roll forming entrance side, the edges are preferably subjected to round shaping by cutting or stone grinding. Such means for performing round shaping requires a certain installation space because its apparatus size is relatively large, therefore the means is hardly installed during or after roll forming since a space between edges of the strip is reduced. Moreover, since the apparatus for cutting or shaving is hard to vertically constrain the strip only by the apparatus itself, high positioning accuracy is required for installation of the apparatus in conjunction with installation of an apparatus for accurately keeping a position through which the strip passes.

Therefore, a station of the apparatus needs to be increased in stiffness, leading to requirement of a further large installation space. When both of the upper and lower edges (corners at both of the upper-surface side and the lower-surface side) of the strip are cut or shaved, since a finpass rolling roll is filled with the strip in finpass rolling (which means finpass forming, hereinafter same as this) during roll forming, the edges of the strip are strongly pressurized, so that the previously shaped, round shape is sometimes crushed and thereby a desired shape may not be obtained. Therefore, it is preferable that a large round shape is previously shaped in consideration of crushing of each strip edge in the finpass rolling. However, when both of the upper and lower edges (corners at both of the upper-surface side and the lower-surface side) of the strip are shaped with a round shape, a large round shape is hardly obtained because of a limit of strip thickness, edges at only one side (corners at only one of the upper-surface side and the lower-surface side) are preferably subjected to cutting or stone grinding.

Next, the other edges (corners at the other surface side), which are not shaped with the round shape, are shaped with the round shape by using finpass rolling. Since edges at only one side are shaped with the round shape from the above reason, edges at an opposite side may be preferably shaped with the round shape during or after roll forming to shape the round shape on both edges.

Thus, we noticed a phenomenon that the edges of the strip were easily crushed in the finpass rolling, and conceived use of the phenomenon. That is, when a fin of a finpass rolling roll is shaped with a round shape, and an angle of the fin and a contact position thereof to a strip edge are optimized depending on the amount of squeezing (the amount of upset) in finpass rolling, edges at a side opposite to a side of the edges of the strip, which were shaped with the round shape before the roll forming, can be also shaped with the round shape. Since such round shaping is performed by the finpass rolling itself, even if a strip is laterally rounded by roll forming, thereby a distance between the lateral, two edges is reduced, or the edges are close to each other, the round shaping can be adequately carried out.

In this way, the upper and lower, two edges of the strip (corners at both of the upper-surface side and the lower-surface side of the strip) can be shaped with the round shape immediately before electric resistance welding.

The round shaping by cutting or shaving is preferably performed to the corners at the upper-surface side of the strip to prevent the relatively large apparatus from interfering with a table at a roll forming entrance side. Moreover, since a lower-surface side of the strip becomes an outer surface side (outer diameter side) of a pipe after roll forming, corners at the lower-surface side is preferably shaped with a round shape during finpass rolling using a fin being changed in shape.

We attempted to optimize the round shape immediately before electric resistance welding by using the cutting or grinding, or finpass rolling and, as a result, understood that radius R in round shaping was preferably 20 to 50% of strip thickness. That is, when the radius R immediately before electric resistance welding is less than 20% of strip thickness, melting steel is somewhat inadequately discharged from the central portion in strip thickness, so that the penetrators are somewhat remained, leading to slight reduction in toughness or strength after electric resistance welding.

When the radius R is more than 50% of strip thickness, a distance in a strip width direction of a round-shaped portion becomes excessively small or excessively large. In the case of the excessively small distance, melting steel is inadequately discharged from the central portion in strip thickness, so that the penetrators are remained, leading to reduction in toughness or strength after electric resistance welding. On the other hand, in the case of the excessively large distance, upset is difficult, and consequently a phenomenon that thickness of a pipe becomes inadequate (a phenomenon that pipe thickness becomes below strip thickness) easily occurs near a boundary between weld and a mother strip.

In still another example, a manufacturing line of electric resistance welding pipes has, in addition to the basic configuration of FIG. 1, a hole-shape roll 32 for shaping the tapering on edges of the strip 20 between the leveler 2 and the roll forming machine 5.

Figure 8A:
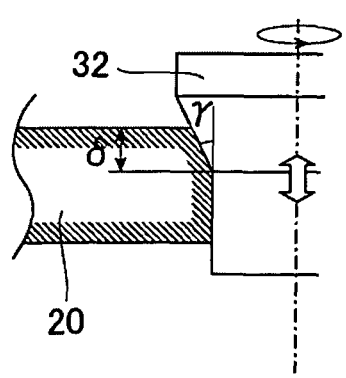
FIGS. 8A and 8B are diagrams showing a situation of shaping the tapering on an edge at the upper-surface side of the strip by a hole-shape roll respectively.
Figure 8B:
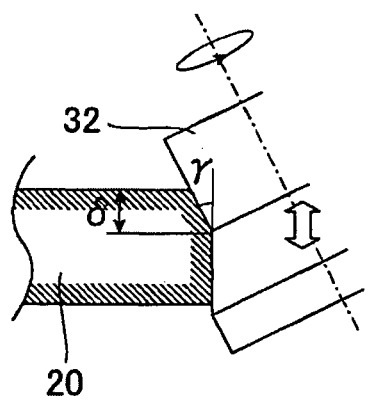

As shown in FIGS. 8A and 8B, the hole-shape roll 32 includes a surface parallel to a strip edge being approximately vertical and a surface inclined to the approximately vertical strip edge, the surfaces being connected to each other, and is movable in a vertical direction. A rotation method of the roll 32 may be designed, as an example shown in FIG. 8A, such that a surface parallel to the approximately vertical strip edge is made as a rotational body, and a rotation axis parallel to the approximately vertical strip edge is provided, or the method may be designed, as an example shown in FIG. 8B, such that a surface parallel to the surface inclined to the approximately vertical strip edge is made as a rotational body, and a rotation axis parallel to the surface inclined to the approximately vertical strip edge is provided.

By rolling the strip 20 by such a hole-shape roll 32, as shown in FIGS. 8A and 8B, edges at the upper-surface side of the strip 20 (inner-surface side of the pipe 30) can be shaped with tapering in which an angle of the tapering from a surface of the strip edge toward a vertical direction (angle of the tapering toward a strip thickness direction) is γ, and length of a perpendicular from a starting position to an end position of the tapering at one side (length of the tapering in the strip thickness direction) is δ.

Furthermore, as shown in FIG. 4A showing a diagram along an arrowed line B-B in FIG. 1 and in FIG. 4B showing a partial detail diagram of FIG. 4A, the end stand 4a of the finpass forming stand 4 has a fin shape including predetermined two-stage tapering (a second-stage tapering angle is α, and second-stage slope vertical-length is β). Such a fin shape is printed to each lateral edge of the strip 20, thereby two lateral edges at a lower-surface side of the strip 20 (outer surface side of the pipe 30) can be shaped with the predetermined tapering.

Thus, when tapering is shaped on edges at an upper-surface side and a lower-surface side of strips having different kinds of thickness, the edges at the upper-surface side of the strip 20 (inner-surface side of the pipe 30) are rolled at predetermined positions in a strip thickness direction using the hole-shape roll 32 with a vertical position thereof being finely adjusted. On the other hand, the edges at the lower-surface side of the strip 20 (outer-surface side of the pipe 30) are printed with tapering at predetermined positions in a strip thickness direction by finpass forming. Thus, the edges of both of the upper and lower surfaces of the strip can be shaped with the predetermined tapering depending on strip thickness without reducing production efficiency.

In this way, the surface parallel to the strip edge and the surface inclined to the strip edge are provided, and the vertically movable hole-shape roll 32 is combined with the finpass end stand 4a having the fin shape including two-stage tapering so that both of the edges at the upper-surface side and the edges at the lower-surface side of the strip are shaped with the tapering. Therefore, even if strips having different kinds of thickness are shaped with tapering, efficiency is not reduced. Moreover, even if a strip is greatly varied in thickness, the hole-shape roll is not applied with an excessive load, therefore the hole-shape roll may not be broken.

The tapering shaped by the hole-shape roll 32 and the finpass end stand 4a is preferably made such that an angle α or γ of tapering immediately before electric resistance welding from the surface of the strip edge toward the vertical direction is in a range of 25° to 50°, and length β or δ of a perpendicular from the starting position to the end position of the tapering at one side is 20% to 40% of strip thickness.

That is, when the tapering angle α or γ is less than 25°, melting steel is inadequately discharged from the central portion in strip thickness, so that penetrators are defectively remained, resulting in reduction in toughness or strength after electric resistance welding, and when the tapering angle α or γ is more than 50°, the tapering is problematically remained as a flaw on a product pipe still after electric resistance welding. Moreover, when the tapering height β or δ is less than 20% of strip thickness, melting steel is inadequately discharged from the central portion in strip thickness, so that the penetrators tend to be remained, and when the tapering height β or δ is more than 40% of strip thickness, the tapering is problematically remained as a flaw on a product pipe still after electric resistance welding.

In this way, since the edges of the strip can be appropriately shaped with the tapering before electric resistance welding, an electric resistance welding pipe having significantly excellent toughness and welding strength can be efficiently manufactured.

The edges at the upper-surface side of the strip 20 (inner-surface side of the pipe 30) are shaped with the tapering before roll forming, and the edges at the lower-surface side of the strip 20 (outer-surface side of the pipe 30) are shaped with the tapering by finpass forming. However, in some case, the edges at the lower-surface side of the strip 20 (outer-surface side of the pipe 30) may be shaped with the tapering before roll forming, and the edges at the upper-surface side of the strip 20 (inner-surface side of the pipe 30) may be shaped with the tapering by finpass forming.

The above description was made assuming a manufacturing line in which the upper-surface side of the strip 20 corresponds to the inner-surface side of the pipe 30. However, our methods and apparatus can be similarly applied to a manufacturing line of electric resistance welding pipes, in which the upper-surface side of the strip 20 corresponds to the outer-surface side of the pipe 30.

In still another example, a manufacturing line of electric resistance welding pipes has, in addition to the basic configuration of FIG. 1, a hole-shape roll 32 for shaping the tapering on edges of the strip 20 between the leveler 2 and the roll forming machine 5.

Figure 9:
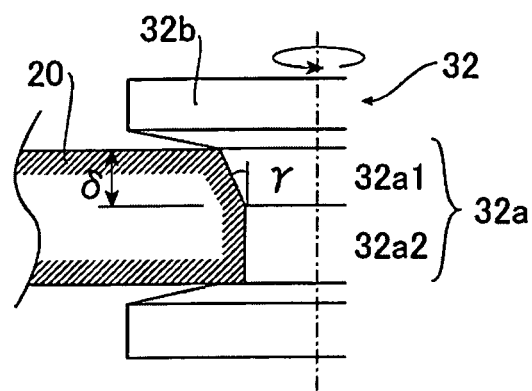
FIG. 9 is a diagram showing a situation of shaping the tapering on an edge at the upper-surface side of the strip by a hole-shape roll.

As shown in FIG. 9, the hole-shape roll 32 has a rolling surface 32a including a vertical rolling surface $32a_1$ and a rolling surface $32a_2$ being inclined at an angle γ, and has flange portions 32b at upper and lower ends of the rolling surface 32a, and has a vertical rotation axis. Width of the rolling surface 3a is approximately the same as thickness of the strip 20, and the upper and lower flange portions 3b pinch the strip 20 so as to constrain the strip 20 in a vertical direction (strip thickness direction).

By rolling the strip 20 by such a hole-shape roll 32, as shown in FIG. 9, edges at the upper-surface side of the strip 20 (inner-surface side of the pipe 30) can be shaped with tapering in which an angle of the tapering with respect to a surface of the strip edge toward a vertical direction (angle of the tapering toward a strip thickness direction) is γ, and length of a perpendicular from a starting position to an end position of the tapering (length of the tapering in the strip thickness direction) at one side is δ.

Furthermore, as shown in FIG. 4A showing a diagram along an arrowed line B-B in FIG. 1 and in FIG. 4B showing a partial detail diagram of FIG. 4A, the end stand 4a of the finpass rolling stand 4 has a fin shape including predetermined two-stage tapering (a second-stage tapering angle is α, and second-stage slope vertical-length is β). Such a fin shape is printed to each lateral edge of the strip 20, thereby two lateral edges at a lower-surface side of the strip 20 (outer surface side of the pipe 30) can be shaped with the predetermined tapering.

The tapering shaped by the hole-shape roll 32 and the tapering by the finpass end stand 4a are preferably made such that an angle α or γ of tapering immediately before electric resistance welding from the surface of the strip edge toward the vertical direction is in a range of 25° to 50°, and length β or δ of a perpendicular from the starting position to the end position of the tapering at one side is 20% to 40% of strip thickness.

That is, when the tapering angle α or γ is less than 25°, melting steel is inadequately discharged from the central portion in strip thickness, so that penetrators are defectively remained, resulting in reduction in toughness or strength after electric resistance welding, and when the tapering angle α or γ is more than 50°, the tapering is problematically remained as a flaw on a product pipe still after electric resistance welding. Moreover, when the tapering height β or δ is less than 20% of strip thickness, melting steel is inadequately discharged from the central portion in strip thickness, so that the penetrators tend to be remained, and when the tapering height β or δ is more than 40% of strip thickness, the tapering is problematically remained as a flaw on a product pipe still after electric resistance welding.

In this way, since the edges of the strip can be appropriately shaped with the tapering before electric resistance welding, an electric resistance welding pipe having significantly excellent toughness and welding strength can be manufactured.

The edges at the upper-surface side of the strip 20 (inner-surface side of the pipe 30) are shaped with the tapering before roll forming, and the edges at the lower-surface side of the strip 20 (outer-surface side of the pipe 30) are shaped with the tapering by finpass rolling. However, in some case, the edges at the lower-surface side of the strip 20 (outer-surface side of the pipe 30) may be shaped with the tapering before roll forming, and the edges at the upper-surface side of the strip 20 (inner-surface side of the pipe 30) may be shaped with the tapering by finpass rolling.

Moreover, while the above description was made assuming a manufacturing line in which the upper-surface side of the strip 20 corresponds to the inner-surface side of the pipe 30, it is obvious that this disclosure can be similarly applied to a manufacturing line of electric resistance welding pipes, in which the upper-surface side of the strip 20 corresponds to the outer-surface side of the pipe 30.

Furthermore, we investigated means for shaping the tapering on each strip edge without reducing production efficiency even if thickness is varied.

As a result, means for shaping the tapering is changed between the edges at the upper-surface side of the strip and the edges at the lower-surface side of the strip, consequently a plurality of means are used to shape the tapering. That is, the edges at the upper-surface side of the strip and the edges at the lower-surface side thereof are shaped with the tapering by the plurality of means, and edges at one surface side is shaped with the tapering, then edges at the other surface side is shaped with the tapering. Thus, even if thickness is varied, a vertical position of the means for shaping the tapering is simply finely adjusted, and thereby both of the upper and lower edges of the strip can be shaped with the tapering without reducing production efficiency.

In this case, since a strip before roll forming is approximately flat, edges of the strip at one of the surface sides are preferably shaped with the tapering by cutting or grinding before roll forming. However, since the edges of the strip are not work-hardened, the following event may be caused as described before, that is, the edges of the strip are greatly deformed due to an effect of strong pressure on the edges of the strip during finpass forming, consequently most of the shaped tapering may be broken.

Thus, we investigated on how the strip edge is deformed so as to break the tapering during finpass forming. The finpass forming is typically carried out with two or three stands.

As a result, the following was recognized. That is, in the finpass first-stand, since edges of the strip at an entrance side are substantially not work-hardened, tapering is broken by about 40% to 60% in length in a strip thickness direction. In the finpass second-stand, since the edges of the strip have been work-hardened through strong pressurization by the finpass first-stand, 10% to 30% of the remained tapering is broken. Furthermore, if certain number of stands were added behind the second stand, 10% to 30% of tapering remained in a previous stand is broken in each stand.

On the other hand, as a result of investigation on an optimum tapering shape immediately before electric resistance welding after finpass forming, it was understood that an angle from a perpendicular (angle of tapering toward a strip thickness direction) was preferably in a range of 25° to 50°, and length of a perpendicular (length of tapering in a strip thickness direction) from the starting position to the end position of the tapering was preferably 20% to 40% of strip thickness.

That is, when the angle from the perpendicular is less than 25°, melting steel is inadequately discharged from the central portion in strip thickness, so that penetrators are defectively remained, resulting in reduction in toughness or strength after electric resistance welding, and when the angle from the perpendicular is more than 50°, the tapering is problematically remained as a flaw on a product pipe still after electric resistance welding. Moreover, when the length of the perpendicular from the starting position to the end position of the tapering is less than 20% of strip thickness, melting steel is inadequately discharged from the central portion in strip thickness, so that the penetrators tend to be remained, and when the length is more than 40% of strip thickness, the tapering is problematically remained as a flaw on a product pipe still after electric resistance welding.

From the results, it was understood that when the tapering to be previously shaped on the edges of the strip at one surface side by cutting or grinding before roll forming (before finpass forming) was calculated backward, the length of the perpendicular from the starting position to the end position of the tapering was preferably 50% to 90% of strip thickness.

Finpass forming in the middle of roll forming is preferably used for shaping the tapering on edges of the strip at the other surface side. The reason for this is as follows. Since the finpass roll is filled with the strip in the finpass forming, the edges of the strip are strongly pressurized during the finpass forming. Therefore, in the finpass forming, it is preferable that a fin shape is made to include at least two stages of tapering, and the fin shape is printed to the strip by using the strong pressure on the edges of the strip.

The tapering shaped in the finpass forming is made, as described before, such that the angle from the perpendicular (angle of tapering toward a strip thickness direction) is 25° to 50°, and length of the perpendicular from the starting position to the end position of the tapering (length of tapering in a strip thickness direction) is 20% to 40% of strip thickness, which corresponds to the optimum tapering shape after the finpass forming and immediately before electric resistance welding.

FIG. 1 shows a manufacturing line of electric resistance welding pipes, which is configured based on the above consideration. The manufacturing line of electric resistance welding pipes has a basic configuration where a strip 20 is uncoiled from an uncoiler 1; then the strip is reformed to be flat by a leveler 2; then the strip 20 is gradually rounded by a roll forming machine 5; then two lateral edges of the rounded strip 20 are subjected to electric resistance welding using an electric resistance welder including an induction heating section 6 and a squeeze roll (electric resistance welding section) 7 so as to be formed into a pipe 30; then a weld bead portion of the pipe 30 is cut by a bead cutter 8; then the pipe 30 after cutting is adjusted in outer diameter by a sizer 9; and then the pipe is cut out into a predetermined length by a pipe cutter 10. The roll forming machine 5 has a finpass forming stand 4 having a predetermined number of stands (herein, two stands) in a last stage.

Figure 10:
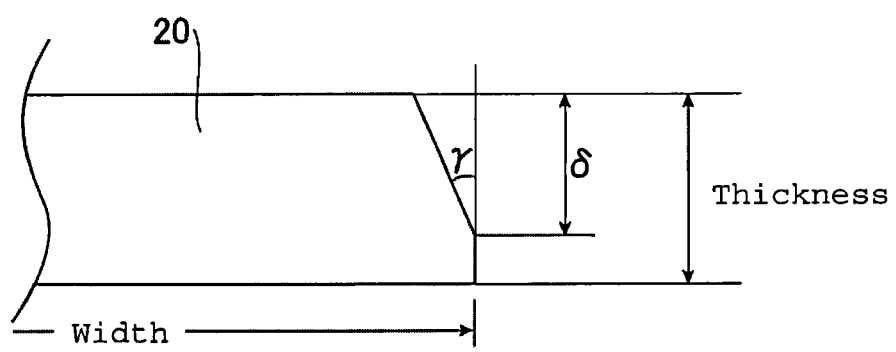
FIG. 10 is a diagram showing the tapering shaped on the edge at the upper-surface side of the strip before roll forming.
Figure 11:
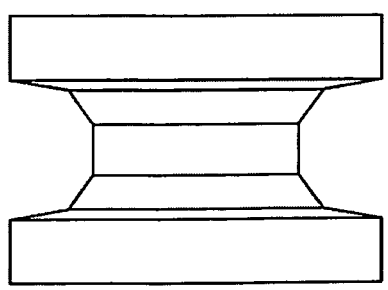
FIG. 11 is a diagram showing a prior hole-shape roll.

In addition to the basic configuration, the manufacturing line has a pair of cutting tools, each having cutting blades disposed in a roll shape, (or roll-shape grinding stones) 3 in a lateral direction of the strip 20 between the leveler 2 and the roll forming machine 5. Thus, as shown in FIG. 10, two lateral edges at the upper-surface side of the strip 20 (inner-surface side of the pipe 30) are shaped with the tapering in which an angle toward a strip thickness direction (tapering angle) γ is 25° to 40°, and length of the tapering in the strip thickness direction (tapering height) δ is 50% to 90% of strip thickness.

Furthermore, as shown in FIG. 4A showing a diagram along an arrowed line B-B in FIG. 1 and in FIG. 4B showing a partial detail diagram of FIG. 4A, the end stand 4a of the finpass forming stand 4 has a fin shape including predetermined two-stage tapering (a second-stage tapering angle is α, and second-stage slope vertical-length is β). Such a fin shape is printed to the lateral edges of the strip 20, thereby two lateral edges at a lower-surface side of the strip 20 (an outer surface side of the pipe 30) are shaped with tapering in which an angle toward a strip thickness direction (tapering angle) is 25° to 40°, and length of the tapering in the strip thickness direction (tapering height) is 20% to 40% of strip thickness.

Thus, when tapering is shaped on edges at an upper-surface side and a lower-surface side of strips having different kinds of thickness, the edges at the upper-surface side of the strip 20 (inner-surface side of the pipe 30) are subjected to cutting or shaving at predetermined positions in a strip thickness direction using the cutting tools, each having cutting blades disposed in a roll shape, (or roll-shape grinding stones) 3 with a vertical position thereof being finely adjusted. On the other hand, the edges at the lower-surface side of the strip 20 (outer-surface side of the pipe 30) are printed with tapering at predetermined positions in a strip thickness direction by finpass forming. Thus, the edges of both of the upper and lower surfaces of the strip can be shaped with the predetermined tapering depending on strip thickness without reducing production efficiency.

In this case, strip width is sometimes significantly decreased due to end crushing in finpass forming. Therefore, to correct the strip width, a strip is previously increased in width by amount corresponding to such decrease in strip width, and the strip is used to manufacture an electric resistance welding pipe. Thus, an electric resistance welding pipe having a desired outer-diameter can be easily manufactured.

In this way, since the edges of the strip can be appropriately shaped with the tapering before electric resistance welding, an electric resistance welding pipe having significantly excellent toughness and welding strength can be efficiently manufactured.

The edges at the upper-surface side of the strip 20 (inner-surface side of the pipe 30) are shaped with the tapering before roll forming, and the edges at the lower-surface side of the strip 20 (outer-surface side of the pipe 30) are shaped with the tapering by finpass forming. However, in some case, the edges at the lower-surface side of the strip 20 (outer-surface side of the pipe 30) may be shaped with the tapering before roll forming, and the edges at the upper-surface side of the strip 20 (inner-surface side of the pipe 30) may be shaped with the tapering by finpass forming.

The above description was made assuming a manufacturing line in which the upper-surface side of the strip 20 corresponds to the inner-surface side of the pipe 30. However, our methods can be similarly applied to a manufacturing line of electric resistance welding pipes, in which the upper-surface side of the strip 20 corresponds to the outer-surface side of the pipe 30.

Hereinafter, description is made according to selected examples.

Example 1

FIG. 1 shows a pipe manufacturing machine used in the examples. A pipe manufacturing method using the pipe manufacturing machine is as follows. A strip 20 is uncoiled from an uncoiler 1; then the strip is reformed to be flat by a leveler 2; then the strip is gradually rounded laterally by a roll forming machine 5; then two lateral edges of the laterally rounded strip are subjected to electric resistance welding using an electric resistance welder (including an induction heating section 6 and a squeeze roll (electric resistance welding section) 7) so as to be formed into a pipe 30; then a weld bead portion of the pipe 30 is cut by a bead cutter 8; then the pipe 30 after cutting is adjusted in outer diameter by a sizer 9; and then the pipe is cut out into a predetermined length by a pipe cutter 10. The roll forming machine 5 has a breakdown first stand 13 at a former stage side, and a finpass rolling stand 4 in a last stage.

In addition to the above basic configuration, at an entrance side of the roll forming machine 5 and at an exit side of the leveler 2, as cutting or shaving means 31, a tool including cutting blades in a roll shape is arranged, as shown in FIG. 2, such that the roll-shape cutting blades cut portions at an upper-surface side of two lateral edges of the strip 20 so that the portions can be shaped with tapering having a predetermined tapering angle γ and a predetermined tapering distance δ, and a finpass rolling roll of the finpass rolling first-stand 4A is made to have a fin including tapering in two stages as shown in FIG. 4A such that portions at a lower-surface side of the two lateral edges of the strip 20, which is being laterally rounded, are rolled so that the portions can be shaped with tapering having a predetermined tapering angle α and a predetermined tapering distance β.

Example 11

In an example 11, using the pipe manufacturing machine of FIG. 1, steel pipes (pipes) 600 mm in outer diameter were manufactured from a steel strip (strip A) 1920 mm in width and 19.1 mm in thickness. Then, steel pipes (pipes) 600 mm in outer diameter were manufactured from a steel strip (strip B) 1920 mm in width and 11.3 mm in thickness. During pipe manufacturing, tapering was shaped on lateral edges at an upper-surface side of the strip by the cutting or shaving means 31, and shaped on lateral edges at an lower-surface side of the strip by the finpass rolling roll of the finpass rolling first-stand 4A, respectively. The tapering was made to have a tapering angle α of 30° and a tapering distance β of 5 mm (26% of strip thickness) in both of an upper-surface side and a lower-surface side in the strip A, and the tapering was made to have a tapering angle α of 30° and a tapering distance β of 2.5 mm (22% of strip thickness) in both of an upper-surface side and a lower-surface side in the strip B. when a strip is changed from the strip A (19.1 mm in thickness) to the strip B (11.3 mm in thickness), a position of the cutting or shaving means 31 was moved downward by 7.8 mm to finely adjust a cutting position.

Test pieces were cut out from weld of the manufactured steel pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured. Absorbed energy of 125 J or more, and a brittle fracture surface ratio of 35% or less were specified as an allowable range of performance respectively.

Example 12

In an example 12, the tapering angle α in example 1 is changed to 40°, and except for this, pipes are manufactured and subjected to the Charpy test to evaluate performance thereof in the same way as in the example 1.

Comparative Example 1

In a comparative example 1, the pipe manufacturing machine as shown in FIG. 1 was used. Furthermore, in addition to the basic configuration of the machine, a hole-shape rolling roll 32 as shown in FIG. 9 was arranged in place of the cutting or shaving means 31 at an entrance side of the roll forming machine 5, that is, an exit side of the leveler 2 such that two lateral edges of the strip 20 were rolled so that the two edges at both of the upper-surface side and the lower-surface side were able to be concurrently shaped with tapering having a predetermined tapering angle α and a predetermined tapering distance L. In the finpass rolling roll of the finpass rolling stand 4, a fin does not have two-stage tapering in any roll as in the typical case.

Using the pipe manufacturing machine of FIG. 1, steel pipes (pipes) 600 mm in outer diameter were manufactured from a steel strip (strip A) 1920 mm in width and 19.1 mm in thickness. Then, steel pipes (pipes) 600 mm in outer diameter were manufactured from a steel strip (strip B) 1920 mm in width and 11.3 mm in thickness. During pipe manufacturing, portions at both of the upper-surface side and the lower-surface side of lateral edges of the strip were rolled by a hole-shape rolling roll 12 so that the portions were shaped with tapering. A shape of the tapering was made to be the same shape as in the example 11. When a strip is changed from the strip A (19.1 mm in thickness) to the strip B (11.3 mm in thickness), operation of the pipe manufacturing machine was temporarily stopped, and the hole-shape roll 12 for shaping the tapering was changed from a roll for the strip 19.1 mm in thickness to a roll for the strip 11.3 mm in thickness.

The manufactured steel pipes were subjected to a Charpy test to evaluate performance of the pipes as in the example 11.

Prior Art Example 1

A pipe manufacturing machine, was configured by removing the hole-shape roll 32 for shaping the tapering and the cutting or shaving means 31 from the pipe manufacturing machine of FIG. 1 in the comparative example 1. During pipe manufacturing, the strip 20 was not shaped with tapering at two lateral edges, and was kept to have a rectangular section profile. Except for this, steel pipes are manufactured and subjected to the Charpy test to evaluate performance thereof in the same way as in the comparative example 1.

Measurements were made on Charpy impact values and brittle fracture surface ratios of weld of the steel pipes manufactured according to the examples, and results of the measurements are shown in Table 1. Production efficiency in each of the examples is also shown in Table 1. The production efficiency is shown by relative ratios of reciprocals of production time to a value (normalized to 1) in the prior art example 1.

TABLE 1

|  | Means for shaping the tapering before roll forming | Means for shaping the tapering during roll forming | Tapering angle immediately before electric resistance welding | Charpy impact value | Brittle fracture surface ratio | Production efficiency |
|---|---|---|---|---|---|---|
| Example 11 | Cutting roll | Finpass rolling roll | Tapering angle α = 30°<br>Tapering distance β of strip A = 5.0 mm<br>Tapering distance β of strip B = 2.5 mm | 180 J | 15% | 1 |
| Example 12 | Cutting roll | Finpass rolling roll | Tapering angle α = 40°<br>Tapering distance β of strip A = 5.0 mm<br>Tapering distance β of strip B = 2.5 mm | 190 J | 13% | 1 |
| Comparative example 1 | Hole-shape rolling roll | Not provided | Tapering angle α = 30°<br>Tapering distance β of strip A = 5.0 mm<br>Tapering distance β of strip B = 2.5 mm | 170 J | 18% | 0.7 |
| Prior art example 1 | Not provided | Not provided | No tapering | 20 J | 58% | 1 |

From Table 1, in a product steel pipe according to the prior art example 1, weld has low impact strength and a large brittle fracture surface ratio, that is, toughness is reduced, and reliability of products is low. In a product steel pipe according to the comparative example 1, weld has high impact strength and a small brittle fracture surface ratio compared with the prior art example 1, that is, toughness is excellent, and reliability of products is high, but production efficiency is reduced. In contrast to these, in a steel pipe according to each of the examples 11 and 12, it is clear that the weld has toughness equal to or higher than that in the comparative example 1, in addition, production efficiency is high in approximately the same level as in the prior art example 1.

While the tapering shaped in the example is made such that the upper-surface side of the strip and the lower-surface side thereof are in symmetry with respect to a center plane in strip thickness, this is not restrictive, and tapering may be shaped such that the upper-surface side of the strip and the lower-surface side thereof are in asymmetry with respect to the center plane in strip thickness. When a pipe manufacturing machine vertically opposite to the machine of FIG. 1 (that is, the upper-surface side of the strip corresponds to an outer-surface side of a pipe) is used, it is preferable that tapering is shaped on portions at the lower-surface side of lateral edges of the strip by cutting or shaving before forming, and tapering is shaped by finpass rolling on portions at the upper-surface side of the lateral edges of the strip.

Example 2

Electric resistance welding pipes 600 mm in diameter were manufactured using a strip (steel strip) 1920 mm in width and 19.1 mm in thickness. Then, electric resistance welding pipes 600 mm in diameter were manufactured using a strip (steel strip) 1920 mm in width and 11.3 mm in thickness.

Then, test pieces were cut out from weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured. Absorbed energy of 125 J or more, and a brittle fracture surface ratio of 35% or less were specified as an allowable range of performance respectively.

Example 21

As an example 21, the above electric resistance welding pipes were manufactured according to the first embodiment. In manufacturing, the cutting roll 31*a* shown in FIG. 3A was used as the cutting or shaving means 31 for shaping the tapering on both lateral edges at an upper-surface side of the strip. The slope angle α of tapering was made to be 30° at both of the upper-surface side and a lower-surface side. When strip thickness was changed from 19.1 mm to 11.3 mm, a vertical position of the cutting roll 31*a* was moved downward by 7.8 mm to be finely adjusted.

Example 22

As an example 22, the above electric resistance welding pipes were manufactured according to the first embodiment. In manufacturing, the shaving roll 31*b* shown in FIG. 3B was used as the cutting or shaving means 31 for shaping the tapering on both lateral edges at an upper-surface side of the strip. The slope angle α of tapering was made to be 40° at both of the upper-surface side and a lower-surface side. When strip thickness was changed from 19.1 mm to 11.3 mm, a vertical position of the shaving roll 31*b* was moved downward by 7.8 mm to be finely adjusted.

Example 23

As an example 23, the above electric resistance welding pipes were manufactured according to the second embodiment. In manufacturing, the cutting roll with tapering 31*c* shown in FIG. 6A was used as the cutting or shaving means 31 for shaping the tapering on both lateral edges at an upper-surface side of the strip. The slope angle α of tapering was made to be 30° at both of the upper-surface side and a lower-surface side. When strip thickness was changed from 19.1 mm to 11.3 mm, a vertical position of the cutting roll with tapering 31*c* was moved downward by 7.8 mm to be finely adjusted.

Example 24

As an example 24, the above electric resistance welding pipes were manufactured according to the second embodiment. In manufacturing, the shaving roll with tapering 31*d* shown in FIG. 6B was used as the cutting or shaving means 31 for shaping the tapering on both lateral edges at an upper-surface side of the strip. The slope angle α of tapering was made to be 40° at both of the upper-surface side and a lower-surface side. When strip thickness was changed from 19.1 mm to 11.3 mm, a vertical position of the shaving roll with tapering 31*d* was moved downward by 7.8 mm to be finely adjusted.

Comparative Example 2

As a comparative example 2, the above electric resistance welding pipes were manufactured through the manufacturing line shown in FIG. 1 while a hole-shape rolling roll was provided between the leveler 2 and the roll forming machine 5, and the hole-shape rolling roll was used to shape the tapering on both lateral edges at an upper-surface side and a lower-surface side of the strip. The slope angle α of the tapering was made to be 30° at both of the upper-surface side and the lower-surface side. In manufacturing, the cutting or shaving means 31 was removed, and a fin shape of the finpass forming end stand 4*a* was made to include usual one-stage tapering. When strip thickness was changed from 19.1 mm to 11.3 mm, the manufacturing line was temporarily stopped, and the hole-shape rolling roll was changed from a roll for the strip 19.1 mm in thickness to a roll for the strip 11.3 mm in thickness.

Prior-Art Example 2

As a prior-art example 2, the above electric resistance welding pipes were manufactured through the manufacturing line shown in FIG. 1 while both lateral edges of the strip were smoothly ground between the leveler 2 and the roll forming machine 5. In manufacturing, the cutting or shaving means 31 was removed, and a fin shape of the finpass forming end stand 4*a* was made to include usual one-stage tapering. When strip thickness was changed from 19.1 mm to 11.3 mm, manufacturing was continued without stopping the manufacturing line.

Measurements were made on Charpy impact values and brittle fracture surface ratios of weld of the electric resistance welding pipes manufactured according to the examples, and results of the measurements are shown in Table 2. The table also shows a ratio of production efficiency in each example to production efficiency, which is assumed to be 1, in the comparative example 2.

TABLE 2

| | Means for shaping the tapering at upper surface side | Means for shaping the tapering at lower surface side | Tapering angle immediately before electric resistance welding | Charpy impact value | Brittle fracture surface ratio | Production efficiency |
|---|---|---|---|---|---|---|
| Example 21 | Cutting roll | Finpass forming roll | 30 degrees | 180 J | 15% | 1.5 |
| Example 22 | Shaving roll | Finpass forming roll | 40 degrees | 180 J | 15% | 1.5 |
| Example 23 | Cutting roll with tapering | Finpass forming roll | 30 degrees | 180 J | 15% | 1.5 |
| Example 24 | Shaving roll with tapering | Finpass forming roll | 40 degrees | 180 J | 15% | 1.5 |

TABLE 2-continued

|  | Means for shaping the tapering at upper surface side | Means for shaping the tapering at lower surface side | Tapering angle immediately before electric resistance welding | Charpy impact value | Brittle fracture surface ratio | Production efficiency |
|---|---|---|---|---|---|---|
| Comparative example 2 | Hole-shape rolling roll | Not provided | 30 degrees | 170 J | 18% | 1.0 |
| Prior art example 2 | Not provided | Not provided | No tapering | 20 J | 58% | 1.5 |

From Table 2, in the electric resistance welding pipes according to the examples of the invention 21 to 24, weld has high impact strength and a small brittle fracture surface ratio, that is, toughness is excellent, and reliability of products is high. In contrast, in the electric resistance welding pipes according to the prior art example 2, weld has low impact strength and a large brittle fracture surface ratio, that is, toughness is reduced, and reliability of products is low. Moreover, the examples 21 to 24 are significantly improved in production efficiency compared with the comparative example 2.

Consequently, it was confirmed that an electric resistance welding pipe having excellent characterization of welded seams was able to be efficiently manufactured according to our methods.

Example 3

In the example, the pipe manufacturing equipment shown in FIG. 1, or partially modified equipment of this was used. The pipe manufacturing equipment is configured by an uncoiler 1, a leveler 2, a roll forming machine 5, induction heating means (induction heating coil) 6, a squeeze roll 7, bead cutting means (bead cutting bite) 8, a sizer 9, and a pipe cutter 10, those being disposed in this order. The roll forming machine 5 includes a plurality of roll stands arranged over stages from a coarse forming stage including a breakdown first stand 13 to a finish forming stage including a finpass forming roll 4.

In the pipe manufacturing equipment, a strip (sheet) 20 is uncoiled by the uncoiler 1; then the strip is reformed to be flat by the leveler 2; then the strip is laterally gradually rounded by the plurality of roll stands arranged over the stages from the coarse forming stage to the finish forming stage of the roll forming machine 5; and then the strip is subjected to finish forming by the finpass forming roll 4. Since lateral rounding of the strip 20 is substantially started from the breakdown first stand 13, a portion before roll forming refers to a portion from an exit side of the leveler 2 to an entrance side of the breakdown first stand 13.

The strip 20 is formed into an opened-pipe shape after the finish forming, and two edges in a lateral direction (circumferential direction of the opened pipe) of the strip is heated by the induction heating means 6, and then contacted by pressing (subjected to electric resistance welding) by the squeeze roll 7 to form a pipe. Then, a bead of weld of the pipe is removed by cutting using the bead cutting means 8, and then the pipe is subjected to constant-diameter rolling by the sizer 9, and then the pipe is cut into a predetermined length by the pipe cutter 10.

Figure 7:
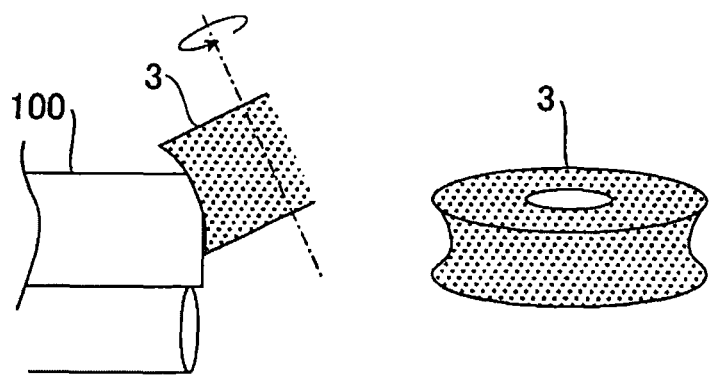
FIG. 7 is a schematic diagram showing an example of an embodiment of performing round shaping of a corner at an upper-surface side of a strip by stone grinding.

In the pipe manufacturing equipment of FIG. 1, as an example, stone grinding means 31 for round shaping (refer to FIG. 7) of each corner at the upper-surface side of the strip is disposed at a roll forming entrance side. In addition, fin corners of the finpass forming roll 4 are shaped with a round shape in place of the tapering, so that each corner at the lower-surface side of the strip (outer-diameter side of the pipe) is round-shaped by finpass forming.

A steel strip 1920 mm in width and 19.1 mm in thickness and a steel strip 1920 mm in width and 15.3 mm in thickness were used in this order as strips, and in both cases, steel pipes (electric resistance welding pipes) were manufactured with outer diameter of product pipes being 600 mm.

Test pieces were cut out from weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured.

Absorbed energy of 125 J or more, and a brittle fracture surface ratio of 35% or less were specified as an allowable range of performance respectively. The following four kinds of conditions were used as manufacturing conditions.

As an example 31, pipes were manufactured using the pipe manufacturing equipment of FIG. 1. During pipe manufacturing, each corner at the upper-surface side of the strip was shaped with a round shape by stone grinding before roll forming, then each corner at the lower-surface side of the strip (outer-diameter side of the pipe) was shaped with a round shape by finpass forming. Radius R of the shaped round shape was made to be 7 mm (37% of strip thickness of 19.1 mm, and 46% of strip thickness of 15.3 mm).

When strip thickness was changed from 19.1 mm to 15.3 mm, a position of the grinding stone was moved downward by 3.8 mm to be finely adjusted.

As an example 32, pipes were manufactured using pipe manufacturing equipment in which a cutting roll (omitted to be shown) was disposed in place of the stone grinding means 3 in FIG. 1. During pipe manufacturing, each corner at the upper-surface side of the strip was shaped with a round shape by roll cutting using the cutting roll before roll forming, then each corner at the lower-surface side of the strip (outer-diameter side of the pipe) was shaped with a round shape by finpass forming. Radius R of the shaped round shape was made to be 4 mm (21% of strip thickness of 19.1 mm, and 26% of strip thickness of 15.3 mm).

When strip thickness was changed from 19.1 mm to 15.3 mm, a position of the cutting roll was moved downward by 3.8 mm to be finely adjusted.

As a comparative example 3, pipes were manufactured using pipe manufacturing equipment in which a hole-shape roll for forming lateral edges (omitted to be shown) was disposed in place of the stone grinding means 3 in FIG. 1, and fin corners of the finpass forming roll 4 were made to be in an approximately rectangular shape. During pipe manufacturing, each of corners at both of the upper-surface side and the lower-surface side of the strip was shaped with a round shape by hole-shape rolling using the hole-shape roll for forming lateral edges before roll forming. Radius R of the shaped round shape was made to be 3 mm (16% of strip thickness of 19.1 mm, and 19% of strip thickness of 15.3 mm).

When strip thickness was changed from 19.1 mm to 15.3 mm, the manufacturing line was temporarily stopped, and the hole-shape roll was changed from a roll for the strip 19.1 mm in thickness to a roll for the strip 15.3 mm in thickness.

As a prior art example 3, pipes are manufactured using pipe manufacturing equipment in which the hole-shape roll for forming lateral edges was removed from the pipe manufacturing equipment used in the comparative example 3. Each of corners at both of the upper-surface side and the lower-surface side of the strip was still in an approximate rectangle (approximately rectangular shape).

Measurements were made on Charpy impact values (absorbed energy) and brittle fracture surface ratios of weld of the steel pipes manufactured according to these conditions, and results of the measurements are shown in Table 3. The table also shows manufacturing time in each example by a relative ratio of each manufacturing time to manufacturing time, which is assumed to be 1, in the comparative example 3.

a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured. Absorbed energy of 125 J or more, and a brittle fracture surface ratio of 35% or less were specified as an allowable range of performance respectively.

Example 41

As an example 41, the above electric resistance welding pipes were manufactured according to the embodiment. In manufacturing, edges at an upper-surface side of the strip (edges at an inner-surface side of the pipe) were shaped with approximately straight tapering with the tapering angle γ of 30° using the hole-shape roll 32 shown in FIGS. 8A and 8B. Then, edges at an lower-surface side of the strip (edges at an outer-surface side of the pipe) were shaped with approximately straight tapering with the tapering angle α of 30° by finpass forming. When strip thickness was changed from 19.1

TABLE 3

| | Means for shaping corners at upper-surface side of strip | Means for shaping corners at lower-surface side of strip | Shape of lateral edge of strip | Charpy impact value | Brittle fracture surface ratio | Manufacturing time |
|---|---|---|---|---|---|---|
| Example 31 | Stone grinding | Finpass forming roll | Round shaping, radius of 7 mm | 250 J | 8% | 0.7 |
| Example 32 | Cutting roll | Finpass forming roll | Round shaping, radius of 4 mm | 280 J | 7% | 0.7 |
| Comparative example 3 | Hole-shape roll (same between upper and lower sides) | Hole-shape roll (same between upper and lower sides) | Round shaping, radius of 3 mm | 180 J | 15% | 1 |
| Prior art example 3 | Not provided | Not provided | Approximately rectangle | 25 J | 55% | 0.7 |

From Table 3, in the examples 31 and 32, weld has high impact strength and a small brittle fracture surface ratio, that is, toughness is excellent, and reliability of products is high. In contrast, in the prior art example 3, weld has low impact strength and a large brittle fracture surface ratio, that is, toughness is reduced, and reliability of products is low.

Furthermore, in the examples 31 and 32, manufacturing time is significantly reduced compared with the comparative example 3, showing that a product of an electric resistance welding pipe having excellent characterization of welded seams can be efficiently manufactured according to our methods.

Example 4

Electric resistance welding pipes 600 mm in diameter were manufactured using a strip (steel strip) 1920 mm in width and 19.1 mm in thickness. Then, electric resistance welding pipes 600 mm in diameter were manufactured using a strip (steel strip) 1920 mm in width and 11.3 mm in thickness.

Then, test pieces were cut out from weld of the manufactured electric resistance welding pipes, and subjected to a Charpy test to evaluate performance of the pipes. Charpy test pieces were sampled by one for each of ten different points in mm to 11.3 mm, a position of the hole-shape roll 32 was moved downward by 7.8 mm to be finely adjusted.

Comparative Example 4

As a comparative example 4, when the above electric resistance welding pipes were manufactured, after leveler working, or before roll forming, both of edges at an upper-surface side of the strip and edges at a lower-surface side thereof were concurrently shaped with approximately straight tapering with the tapering angle of 30° using the usual hole-shape roll shown in FIG. 4. When strip thickness was changed from 19.1 mm to 11.3 mm, the manufacturing line was temporarily stopped, and the hole-shape roll was changed from a roll for the strip 19.1 mm in thickness to a roll for the strip 11.3 mm in thickness.

Prior-Art Example 4

As a prior-art example 4, when the above electric resistance welding pipes were manufactured, after leveler working, or before roll forming, each strip edge was vertically smoothly ground, then the electric resistance welding pipes were manufactured via usual roll forming. When strip thickness was changed from 19.1 mm to 11.3 mm, the manufacturing line was temporarily stopped, but operation was restarted to continue manufacturing.

Measurements were made on Charpy impact values and brittle fracture surface ratios of weld of the electric resistance welding pipes manufactured according to the examples, and results of the measurements are shown in Table 4. The Table 4 also shows a ratio of production efficiency in each example to production efficiency, which is assumed to be 1, in the comparative example 4.

TABLE 4

| | Means for shaping the tapering before roll forming | Means for shaping the tapering during roll forming | Tapering angle immediately before electric resistance welding | Charpy impact value | Brittle fracture surface ratio | Production efficiency |
|---|---|---|---|---|---|---|
| Example 41 | Hole-shape roll | Finpass forming roll | 30° | 180 J | 15% | 1.3 |
| Comparative example 4 | Hole-shape roll | Not provided | 30° | 170 J | 18% | 1.0 |
| Prior art example 4 | Not provided | Not provided | No tapering | 20 J | 58% | 1.3 |

From Table 4, in the electric resistance welding pipes according to the example 41, weld has high impact strength and a small brittle fracture surface ratio, that is, toughness is excellent, and reliability of products is high. In contrast, in the electric resistance welding pipes according to the prior art example 4, weld has low impact strength and a large brittle fracture surface ratio, that is, toughness is reduced, and reliability of products is low. Moreover, the example 41 is significantly improved in production efficiency compared with the comparative example 4.

Consequently, it was confirmed that an electric resistance welding pipe having excellent characterization of welded seams was able to be efficiently manufactured according to our methods.

Example 5

Electric resistance welding pipes 600 mm in diameter were manufactured using a strip (steel strip) 1920 mm in width and 19.1 mm in thickness.

Then, test pieces were cut out from weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured. Absorbed energy of 125 J or more, and a brittle fracture surface ratio of 35% or less were specified as an allowable range of performance respectively.

Example 51

As an example 51, the above electric resistance welding pipes were manufactured. In manufacturing, edges at an upper-surface side of the strip (edges at an inner-surface side of the pipe) were shaped with approximately straight tapering with the tapering angle γ of 30° using the hole-shape roll 32 shown in FIG. 9. Then, edges at an lower-surface side of the strip (edges at an outer-surface side of the pipe) were shaped with approximately straight tapering with the tapering angle α of 30° by finpass rolling.

Example 52

As an example 52, the above electric resistance welding pipes were manufactured. In manufacturing, edges at an upper-surface side of the strip (edges at an inner-surface side of the pipe) were shaped with approximately straight tapering with the tapering angle γ of 45° using the hole-shape roll 32 shown in FIG. 9. Then, edges at a lower-surface side of the strip (edges at an outer-surface side of the pipe) were shaped with approximately straight tapering with the tapering angle α of 40° by finpass rolling.

Comparative Example 5

As a comparative example 5, when the above electric resistance welding pipes were manufactured, after leveler working, or before roll forming, both of edges at an upper-surface side of the strip and edges at a lower-surface side thereof were concurrently shaped with approximately straight tapering with the tapering angle of 20° using a cutting tool, then the electric resistance welding pipes were manufactured via usual roll forming.

Prior-Art Example 5

As a prior-art example 5, after leveler working, or before roll forming, each strip edge was vertically smoothly ground, then the electric resistance welding pipes were manufactured via usual roll forming.

Measurements were made on Charpy impact values and brittle fracture surface ratios of weld of the electric resistance welding pipes manufactured according to the examples, and results of the measurements are shown in Table 5.

TABLE 5

|  | Means for shaping the tapering before roll forming | Means for shaping the tapering during roll forming | Tapering angle immediately before electric resistance welding | Charpy impact value | Brittle fracture surface ratio |
|---|---|---|---|---|---|
| Example 51 | Hole-shape roll | Finpass rolling roll | Pipe inner-surface side 30° Pipe outer-surface side 30° | 250 J | 11% |
| Example 52 | Hole-shape roll | Finpass rolling roll | Pipe inner-surface side 30° Pipe outer-surface side 30° | 230 J | 13% |
| Comparative example 5 | Cutting tool | Not provided | Pipe inner-surface side 20° Pipe outer-surface side 20° | 100 J | 40% |
| Prior art example 5 | Not provided | Not provided | No tapering | 20 J | 58% |

From Table 5, in the electric resistance welding pipes according to the examples 51 and 52, weld has high impact strength and a small brittle fracture surface ratio, that is, toughness is excellent, and reliability of products is high. In contrast, in the electric resistance welding pipes according to the comparative example 5 and the prior art example 5, weld has low impact strength and a large brittle fracture surface ratio, that is, toughness is reduced, and reliability of products is low.

Thus, it was confirmed that an electric resistance welding pipe having excellent characterization of welded seams was able to be manufactured according to our methods.

Example 6

Electric resistance welding pipes 600 mm in diameter were manufactured using a strip (steel strip) 1920 mm in width and 19.1 mm in thickness according to the following example 61, example 62, comparative example 6, and prior-art example 6 respectively.

Then, test pieces were cut out from weld of the manufactured electric resistance welding pipes, and subjected to a Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and absorbed energy and brittle fracture surface ratios were measured. Absorbed energy of 125 J or more, and a brittle fracture surface ratio of 35% or less were specified as an allowable range of performance respectively.

Example 61

As an example 61, the above electric resistance welding pipes were manufactured. In manufacturing, after leveler working, or before roll forming, edges at an upper-surface side of the strip (edges at an inner-surface side of the pipe) were cut using a cutting tool (cutting roll) having cutting blades disposed in a roll shape so as to be shaped with approximately straight tapering with a tapering angle of 30° and tapering height of 70% of strip thickness. Then, edges at an outer-surface side of the pipe (edges at a lower-surface side of the strip) were shaped with approximately straight tapering with a tapering angle of 30° and tapering height of 30% of strip thickness by a second stand in two-stand finpass forming.

Example 62

As an example 62, the above electric resistance welding pipes were manufactured. In manufacturing, after leveler working, or before roll forming, edges at an upper-surface side of the strip (edges at an inner-surface side of the pipe) were cut using a roll-shape grinding stone so as to be shaped with approximately straight tapering with a tapering angle of 40° and tapering height of 85% of strip thickness. Then, edges at an outer-surface side of the pipe (edges at a lower-surface side of the strip) were shaped with approximately straight tapering with a tapering angle of 40° and tapering height of 25% of strip thickness by a third stand in three-stand finpass forming.

Comparative Example 6

As a comparative example 6, when the above electric resistance welding pipes were manufactured, after leveler working, or before roll forming, both of edges at an upper-surface side of the strip and edges at a lower-surface side thereof were cut using a roll-shape grinding stone and thereby shaped with approximately straight tapering with a tapering angle of 20° and tapering height of 40% of strip thickness. Then, forming was performed using a three-stand finpass stand having a fin with usual one-stage tapering.

Prior-Art Example 6

As a prior-art example 6, when the above electric resistance welding pipes were manufactured, after leveler working, or before roll forming, each strip edge was vertically smoothly ground, then the electric resistance welding pipes were manufactured via usual roll forming.

Measurements were made on Charpy impact values and brittle fracture surface ratios of weld of the electric resistance welding pipes manufactured according to the examples, and results of the measurements are shown in Table 6. In the comparative example 6, tapering was decreased in height to 10% or less of strip thickness after finpass forming and immediately before electric resistance welding, that is, the tapering height was significantly decreased through finpass forming.

TABLE 6

|  | Shaping the tapering before roll forming | | | Shaping the tapering during roll forming | | | Charpy impact value | Brittle fracture surface ratio |
| --- | --- | --- | --- | --- | --- | --- | --- | --- |
|  | Means for shaping the tapering | Tapering angle | Tapering height | Means for shaping the tapering | Tapering angle | Tapering height | | |
| Example 61 | Cutting roll (upper-surface side of strip) | 30° | 70% of strip thickness | Finpass rolling (lower-surface side of strip) | 30° | 30% of strip thickness | 180 J | 15% |
| Example 62 | Roll-shape grinding stone (upper-surface side of strip) | 40° | 85% of strip thickness | Finpass rolling (lower-surface side of strip) | 40° | 25% of strip thickness | 180 J | 15% |
| Comparative example 6 | Roll-shape grinding stone (upper and lower surfaces of strip) | 20° | 40% of strip thickness | Not provided | No tapering | No tapering | 80 J | 45% |
| Prior art example 6 | Not provided | No tapering | No tapering | Not provided | No tapering | No tapering | 20 J | 58% |

From Table 6, in the electric resistance welding pipes according to the examples 61 and 62, weld has high impact strength and a small brittle fracture surface ratio, that is, toughness is excellent, and reliability of products is high. In contrast, in the electric resistance welding pipes according to the comparative example 6 and the prior art example 6, weld has low impact strength and a large brittle fracture surface ratio, that is, toughness is reduced, and reliability of products is low.

The invention claimed is:

1. A method of manufacturing electric resistance welded pipes, which improves characterization of welded seams, comprising:
    shaping with tapering edges at one of an upper-surface side and a lower-surface side of a strip by cutting or shaving or hole-rolling,
    shaping with tapering edges at another side of the strip by finpass forming, and
    the lower-surface side of the strip in a formed state is subjected to electric resistance welding at final finpass forming by rolling to form the pipe.

2. The method of claim 1, wherein edges at one side in a thickness direction of the strip are round-shaped.

3. The method of claim 1, wherein the cutting or shaving, or the hole-rolling is performed before roll forming.

4. The method of claim 2, wherein the cutting or shaving, or the hole-rolling is performed before roll forming.

5. The method of claim 1, wherein shaping, cutting or hole-rolling is performed with a tool having cutting blades disposed in a roll shape, or a roll-shape grinding stone in which each cutting blade or a stone grinding surface includes a portion approximately parallel to a strip edge, and a portion inclined to the strip edge from a middle point.

6. The method of claim 2, wherein shaping, cutting or hole-rolling is performed with a tool having cutting blades disposed in a roll shape, or a roll-shape grinding stone in which each cutting blade or a stone grinding surface includes a portion approximately parallel to a strip edge, and a portion inclined to the strip edge from a middle point.

7. The method of claim 1, wherein a strip edge is subjected to cutting or grinding while a tool having cutting blades disposed in a roll shape, or a roll-shape grinding stone is contacted parallel to the strip edge, and a strip edge is subjected to cutting or grinding while a tool having different cutting blades disposed in a roll shape, or a roll-shape grinding stone is obliquely contacted to the strip edge so that the strip edges are shaped with tapering.

8. The method of claim 2, wherein a strip edge is subjected to cutting or grinding while a tool having cutting blades disposed in a roll shape, or a roll-shape grinding stone is contacted parallel to the strip edge, and a strip edge is subjected to cutting or grinding while a tool having different cutting blades disposed in a roll shape, or a roll-shape grinding stone is obliquely contacted to the strip edge so that the strip edges are shaped with tapering.

9. The method of claim 1, wherein tapering immediately after cutting or grinding the strip, or tapering immediately after rolling the strip using the hole-shape roll occurs such that an angle from a perpendicular is 25° to 50°, and length of a perpendicular angle from a starting position to an end position of the tapering is 50% to 90% of strip thickness.

10. The method of claim 2, wherein tapering immediately after cutting or grinding the strip, or tapering immediately after rolling the strip using the hole-shape roll occurs such that an angle from a perpendicular is 25° to 50°, and length of a perpendicular angle from a starting position to an end position of the tapering is 50% to 90% of strip thickness.

11. The method of claim 3, wherein tapering immediately after cutting or grinding the strip, or tapering immediately after rolling the strip using the hole-shape roll occurs such that an angle from a perpendicular is 25° to 50°, and length of a perpendicular angle from a starting position to an end position of the tapering is 50% to 90% of strip thickness.

12. The method of claim 5, wherein tapering immediately after cutting or grinding the strip, or tapering immediately after rolling the strip using the hole-shape roll occurs such that an angle from a perpendicular is 25° to 50°, and length of a perpendicular angle from a starting position to an end position of the tapering is 50% to 90% of strip thickness.

13. The method of claim 7, wherein tapering immediately after cutting or grinding the strip, or tapering immediately after rolling the strip using the hole-shape roll occurs such that an angle from a perpendicular is 25° to 50°, and length of a perpendicular angle from a starting position to an end position of the tapering is 50% to 90% of strip thickness.

14. The method of claim 1, wherein tapering of the strip immediately before electric resistance welding occurs such that an angle from a perpendicular is 25° to 50°, and length of a perpendicular from a starting position to an end position of the tapering is 20% to 45% of strip thickness.

15. The method of claim 2, wherein tapering of the strip immediately before electric resistance welding occurs such that an angle from a perpendicular is 25° to 50°, and length of a perpendicular from a starting position to an end position of the tapering is 20% to 45% of strip thickness.

16. The method of claim 3, wherein tapering of the strip immediately before electric resistance welding occurs such that an angle from a perpendicular is 25° to 50°, and length of a perpendicular from a starting position to an end position of the tapering is 20% to 45% of strip thickness.

17. The method of claim 5, wherein tapering of the strip immediately before electric resistance welding occurs such that an angle from a perpendicular is 25° to 50°, and length of a perpendicular from a starting position to an end position of the tapering is 20% to 45% of strip thickness.

18. The method of claim 7, wherein tapering of the strip immediately before electric resistance welding occurs such that an angle from a perpendicular is 25° to 50°, and length of a perpendicular from a starting position to an end position of the tapering is 20% to 45% of strip thickness.

19. The method of claim 9, wherein tapering of the strip immediately before electric resistance welding occurs such that an angle from a perpendicular is 25° to 50°, and length of a perpendicular from a starting position to an end position of the tapering is 20% to 45% of strip thickness.

* * * * *

UNITED STATES PATENT AND TRADEMARK OFFICE
CERTIFICATE OF CORRECTION

PATENT NO. : 8,912,462 B2
APPLICATION NO. : 11/992916
DATED : December 16, 2014
INVENTOR(S) : Kenmochi et al.

It is certified that error appears in the above-identified patent and that said Letters Patent is hereby corrected as shown below:

In the Specification

In Column 10

At line 30, please change "6*f*" to -- of --.

Signed and Sealed this
Twenty-eighth Day of July, 2015

Michelle K. Lee
*Director of the United States Patent and Trademark Office*